United States Patent

[11] 3,601,854

| [72] | Inventor | Raymond Lee Trueblood<br>New Carlisle, Ohio |
|---|---|---|
| [21] | Appl. No. | 804,608 |
| [22] | Filed | Mar. 5, 1969 |
| [45] | Patented | Aug. 31, 1971 |
| [73] | Assignee | Trueblood, Inc.<br>Tipp City, Ohio |

[54] AUTOMATIC PURGING AND SHUTDOWN FOR PLASTIC INJECTION MACHINES
8 Claims, 3 Drawing Figs.

[52] U.S. Cl. ..................................................... 18/30 CM
[51] Int. Cl. ...................................................... B29f 1/04
[50] Field of Search ........................................... 18/30 CK, 30 CM, 30 CV, 30 LS, 2 HA, DIG. 16

[56] References Cited
UNITED STATES PATENTS

| 2,675,583 | 4/1954 | Scherry | 18/30 |
| 3,923,973 | 2/1960 | Ninneman | 18/DIG. 16 |
| 3,080,610 | 3/1963 | Baigent | 18/30 |
| 3,357,049 | 12/1967 | Spindler | 18/12 |

Primary Examiner—J. Spencer Overholser
Assistant Examiner—Michael O. Sutton
Attorney—Marchal, Biebel, French & Bugg

ABSTRACT: An automatic purging and shutdown system combined with a reciprocating screw-type plastic injection machine provides for the automatic operation of the machine, after shutdown of the heater elements, to continue the heating, plasticizing and ejecting of plastic material until the extruder barrel has reached a temperature which permits complete shut down of the extruder without degradation to the plastic material remaining within the barrel.

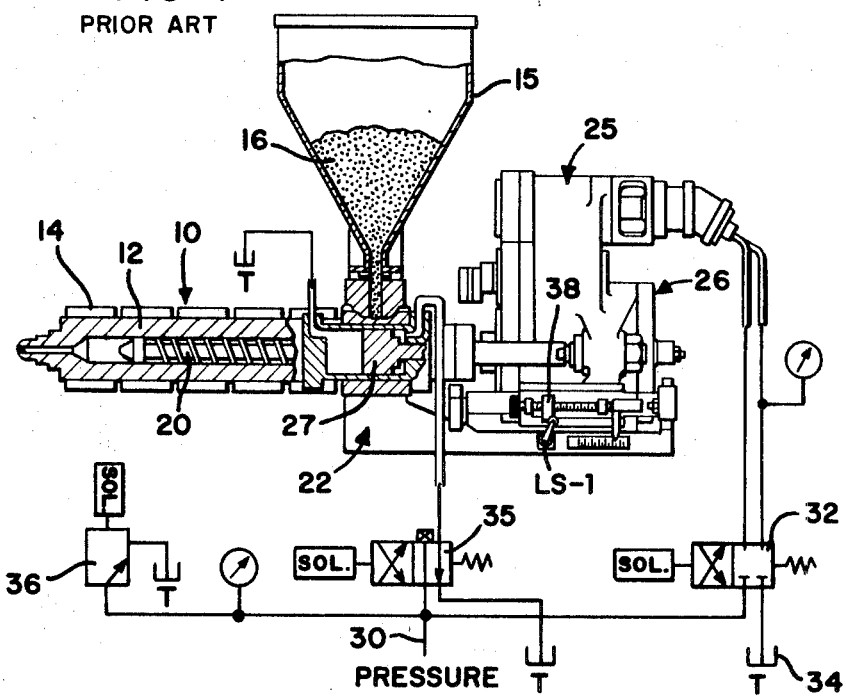
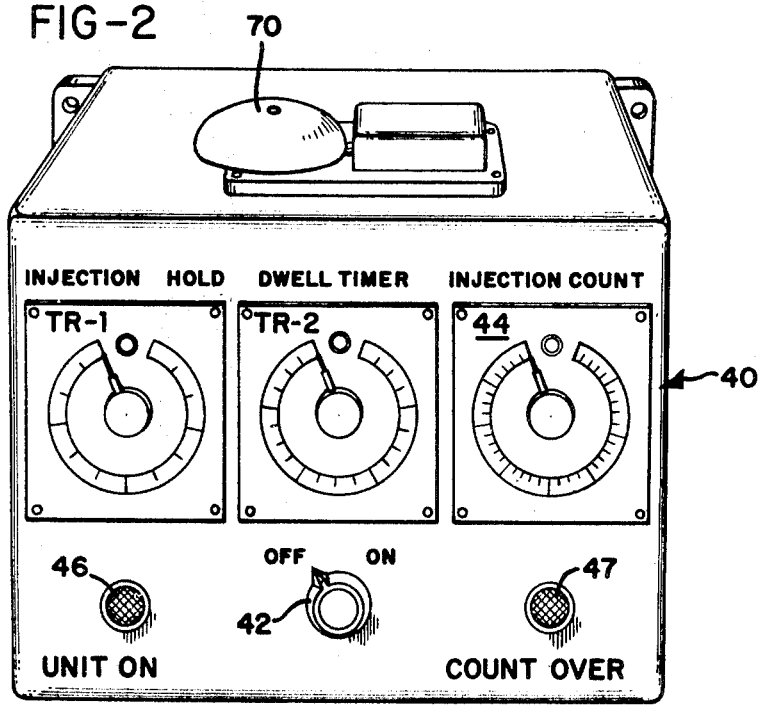

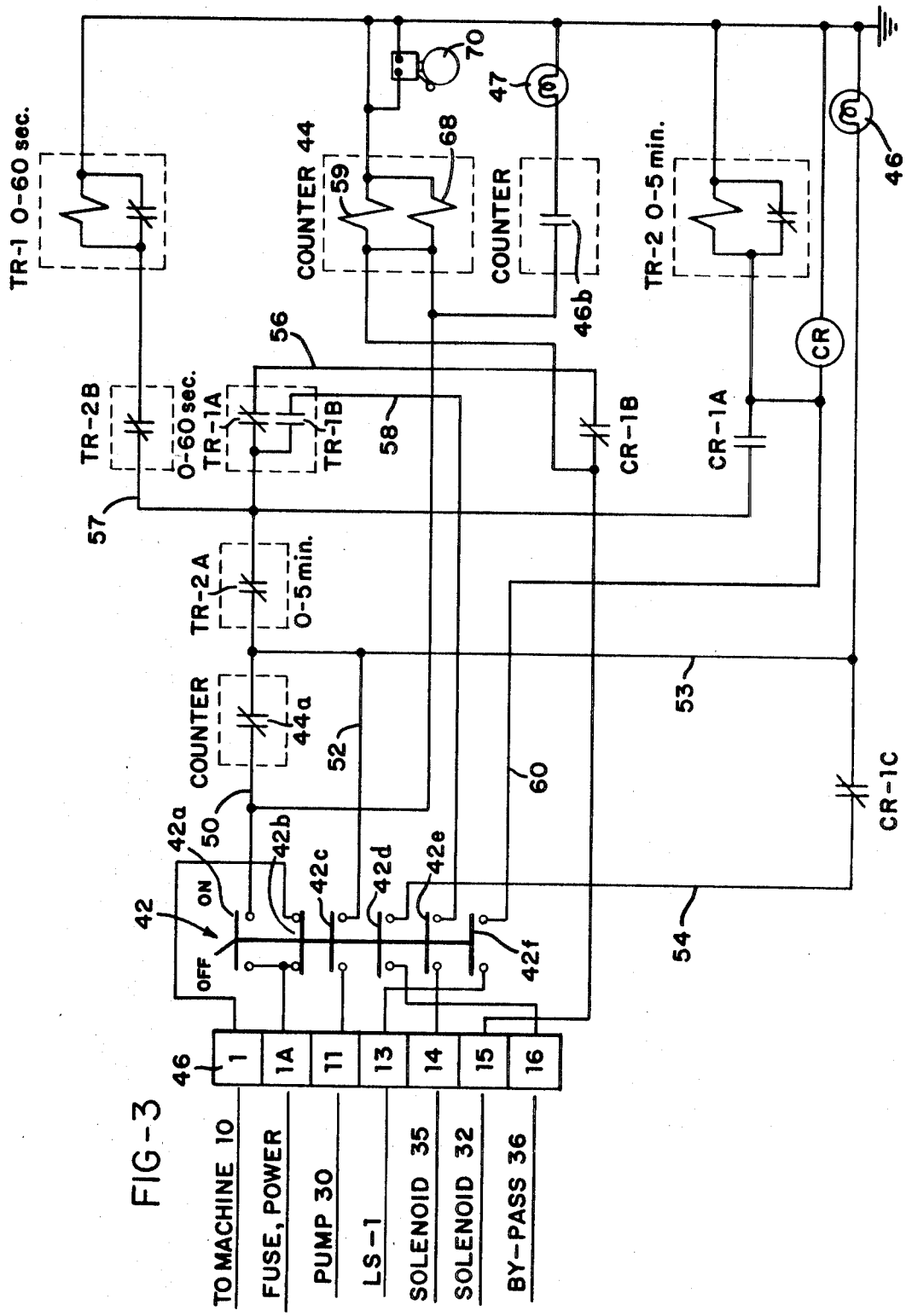

AUTOMATIC PURGING AND SHUTDOWN FOR PLASTIC INJECTION MACHINES

BACKGROUND OF THE INVENTION

The present invention relates to the automatic purging and shut down of reciprocating plastic injection machines, and particularly applies to the reciprocating screw-type of machine, and permits the automatic purging and shut down of such machines without the necessity for attendance by a machine operator.

When a plastic injection machine is operated, the plastic material being plasticized remains in the barrel only a predetermined short period of time, at which point it is ejected into the mold by the axial movement of the screw. It is well known that plastic materials can withstand only varying degrees of soaking at extruding temperatures without undergoing severe degradation or burning of the material. Thus, it is necessary at the conclusion of any shift of operation, or during lunch breaks, coffee breaks, or the like, to shut down such machines by continuing to move plastic material through the machine until the cylinder barrel has reached a safe temperature limit at which time the plastic material remaining in the barrel may be permitted to remain there without fear of degradation. Commonly, the machine operator must plan ahead for this and must shut down the barrel-heating apparatus and begin manual purging until such time as the barrel has reached a safe temperature. This results in loss of work on the machine as well as an uneconomic use of the time of the operator.

SUMMARY OF THE INVENTION

The present invention is directed to automatic apparatus for purging a plastic injection machine, requiring no attention by the operator, for safely lowering the temperature of the barrel and thereafter automatically shutting the machine down. The control system of the present invention may thus be set into operation at the conclusion of a work day or at the conclusion of a work shift, for purging the plastic injection machines automatically, thereby permitting the machine to be used at full capacity throughout the working day. Further, the present apparatus may be used for providing automatic cycling of the machine during lunch hours or during coffee breaks to eliminate the need for shutting down the heater elements and thereby eliminate the warmup time which would be attendant to the restarting of the machine at the end of the coffee break or the lunch hour. The plastic material which is thus ejected is caught up in a trough or pan for reusing by regrinding in the usual manner.

The control system of the present invention is designed advantageously so as to be added on to existing plastic injection machines. It may be used, for example, with reciprocating plunger types of machines in which plastic material is heated within a conventional heating torpedo. The preferred embodiment, however, is described in connection with a conventional reciprocating screw type of plastic injection machine.

The control system of the present invention includes a first timer, preferably adjustable, to time out a predetermined short interval at the forward end of the stroke. The purpose of this timer is to provide for or assure the full ejection of plastic material from the extruder barrel, as different types of plastic material require different intervals of time in order to clear the barrel of the charge of plastic material. The control system further includes a second adjustable timer and which times out a second interval of time during which the plastic material within the barrel is permitted to plasticize by extracting heat from the barrel. Again, this time interval varies with different types of plastic material being used so that the material may be fully plasticized but not charred or burned. The control system controls the solenoid valves of the hydraulic drive system of the reciprocating screw plastic injection machine so as to initiate the forward ejecting movement of the screw at the conclusion of the timed period defined by the second timer. The control system further includes means for shutting down the automatic purging operation when the barrel has cooled sufficiently to prevent degradation of plastic material remaining therein. While this shut down means may be temperature responsive, in the preferred embodiment it consists of a counter which counts out a preset number of full cycles of operation which number is known to be sufficient to cool the barrel down to a safe temperature.

It is accordingly a primary object of this invention to provide automatic purging control system for a plastic injection machine.

A further object of the invention is the provision of an automatic purging and shut down system which incorporates a first timer to define the dwell time on the forward end of the stroke to assure sufficient time for the plastic material to exit the barrel, and a second timer to define an overall dwell or cycle time to assure that the new material introduced into the barrel is fully plasticized and has absorbed the maximum safe amount of heat from the barrel.

These and other objects and advantages of the present invention will become apparent from the following description, the accompanying drawings and the appended claims.

BRIEF DESCRIPTION OF THE DRAWINGS

FIG. 1 is a somewhat diagrammatic and partially sectional view of a typical reciprocating screw injection machine and hydraulic control circuit to which the present invention may be applied;

FIG. 2 is a perspective view of the control unit of this invention; and

FIG. 3 is a wiring diagram of the control unit.

DESCRIPTION OF THE PREFERRED EMBODIMENT

Referring to the figures of the drawing which represent a preferred embodiment of the invention, a conventional reciprocating screw type injector is shown generally at 10 in FIG. 1 as including a cylinder barrel 12 upon which a plurality of electrical sleeve-type heater elements 14 are mounted for heating the barrel. A hopper 15 receives plastic material 16 and is mounted to supply the same to the rear end of the barrel. A rotary and reciprocating screw 20 is received within the barrel and conventionally operates to form a plasticized or molten charge of plastic material in the space ahead of the screw, and then is caused to move axially of the barrel to inject the same through a nozzle on the end of the barrel into the suitable mold, not shown. The barrel 12 is mounted on a frame indicated generally at 22, which frame may be stationary or may be positioned on guideways parallel to the axis of the barrel, so that the entire frame may be moved to bring the nozzle into closing relation with a mold socket.

A hydraulic screw drive motor indicated generally at 25 operates through reduction gearing 26 to apply a rotative force to the screw 20. Also, one or more fluid piston elements 27 are connected to the screw 20 and are operable upon the application of hydraulic force thereto to thrust the screw forwardly in the barrel. A typical such reciprocating screw-type injection machine is shown in Kovach et al. U.S. Pat. No. 3,396,341 issued Aug. 13, 1968.

There is also shown in FIG. 1 a somewhat diagrammatic representation of the hydraulic control system for a typical reciprocating screw plastic injection machine. Thus, a source of hydraulic pressure 30, which may be an electric pump supplies fluid under pressure for the entire system. An electrically operated solenoid valve 32 is operable to apply such hydraulic fluid under pressure from the source 30 to the motor 25 and return the same to the fluid supply tank 34. A second electric solenoid valve 35 applies fluid under pressure to the backside of the piston 27 to force the screw axially of the barrel for injection. The hydraulic system also incorporates a normally open electrically controlled bypass valve 36 which permits the hydraulic fluid to be bypassed at low pressure when the motor 25 or piston 27 is not being used. Further, the system includes various limits switches to define the forward and the retracted positions of the screw, and for the purpose of the present invention, a limit switch LS-1 is shown having its lever arm operated by a movable stop member 38. The stop member 38 is connected so as to move with the screw 20, and closes the normally open switch LS-1 upon the screw attaining a predetermined retraction position.

The control system of this invention may be conveniently contained in a cabinet 40 as shown in FIG. 2 and includes a master on-off switch 42, a first adjustable 60-second adjustable timer TR-1, a second adjustable 5-minute timer TR-2, and an injection counter 44. The timer TR-1 may be set at any desired time between 0 to 60 seconds to time the dwell or hold of the injection screw 20 in the forward position. As previously noted, different types of plastic material take different lengths of time to be pushed out of the barrel or cylinder by the screw 20. Thus, the timer TR-1 forms a first variable timer means which operates in the circuit to hold the screw in its forward position for a predetermined short interval to assure the emptying of the barrel of plasticized material. At the conclusion of its time out, timer TR-1 causes the control circuit to apply power again to the screw to cause it to rotate and prepare a new charge of plastic material in its conventional manner.

The second timer TR-2 determines the overall time period of the automatic purging cycle. It is preferably a timer of from 0 to 5 minutes and controls the amount of time that the screw 20 is permitted to rest or remain in the retracted position before hydraulic fluid under pressure is applied to the cylinder 27 to cause the ejection of the material. Thus, the timer TR-2 may be considered as a second variable timer means which is operable to initiate a subsequent ejection cycle after a predetermined time delay providing for the absorption of heat from the barrel 12 by the new charge of plastic material.

The counter 44 may be manually preset to count out a given number of full cycles of operation. Then, the counter 44 is effective, at the conclusion of the last cycle, to shut down the automatic purge operation, as well as to shut down the pump supplying the source of hydraulic pressure and the other electrical functions necessary to the full shutdown of the plastic injection machine.

The on-off switch 42 is a multiple ganged switch which operates to transfer operation from the injection machines normal control to the control provided by this invention, and when first operated serves to initiate the cycles of operation of purging. The cabinet 40 further may include a green light 46 which shows that purging is in progress, and a red light 47 which shows that the purging has been completed and that the injection machine cannot be operated in the normal manner until the switch 42 is returned to the "off" position.

Reference may be had to the wiring diagram of FIG. 3 for a fuller understanding of the operation of the present invention. It will be seen that the switch 42 operates to apply the main line voltage, comprising the main powerline to the injection machine, from terminal 1A of the inlet terminal strip 46 to terminal 1, in the "off" position of the switch. When the switch 42 is turned on, this connection is broken and may therefore conveniently be employed to disconnect other desired power functions to the injection machine, such as to disconnect the electrical power to the electrical heater bands 14, if desired.

When the switch 42 is closed, a cycle of operation is initiated in the following manner: power is applied on line 50 to normally closed counter contacts 44a and then on line 52 back through a pair of closed contacts 42a of the switch 42 to terminal 11 for applying power to the hydraulic pump motor. Simultaneously, power is applied by line 53 through normally closed contacts CR-IC of control relay CR-1 through a line 54 and closed contacts 42d to apply power to the high pressure bypass solenoid 36, thus activating the solenoid and eliminating the low pressure bypass.

At the same time, power is applied through the normally closed contacts TR-2A of timer TR-2 and through the normally closed contacts TR-1A of timer TR-1 through a line 56 and normally closed contacts CR-1B to switch contacts 42e to apply power to the injection solenoid 35, which causes the hydraulic fluid under pressure to be applied to the piston 27, affecting axial ejecting movement of the screw 20 to remove the charge which was formed forward of the screw within the barrel 12. Simultaneously, power is applied on a line 57 through the normally closed timer contacts TR-2B to the control circuit of timer TR-1 thus initiating the cycle of operation of the first timer means.

The line 56 also energizes the forward coil 59 of the counter 44 which causes the counter to move one step forward. The counter 44 thus moves one step in each cycle of operation until it has reached the last of the predetermined counts set in on the dial at which point the counter contacts 44a are opened. Also, at the end of the count, counter contacts 44b are closed, thus applying power to the light 47.

At the termination of the preset time set on the first timer, which may be anywhere from 0 to 60 seconds, allowing sufficient time for the plastic material to have been moved by the screw 20 through the nozzle at the end of the barrel, and timer contacts TR-1A are opened and timer contacts TR-1B are closed. This applies power on a line 58 to the screw solenoid 32, thus initiating rotation of the screw by the application of hydraulic fluid under pressure through the screw motor 25. Thus, the screw operates to receive an additional charge of plastic material 15 and in doing so it retracts within the barrel 12 by forcing the fluid behind the piston 27 back to the tank 34, in the conventional manner.

When the screw 12 has reached a predetermined retracted position, as defined by the setting of the movable stop member 38, the limit switch LS-1 is tripped. This supplies power to terminal 13 of the terminal block and through closed switch contacts 42f to a line 60 to actuate the relay CR-1. The function of the relay CR-1 is to provide an interlock and also to disable the hydraulic circuit by opening the high pressure bypass solenoid 36. This is accomplished by the opening of the normally closed relay contacts CR-1C Line 60 also applies power to initiate the operation of the control circuit for the second timer TR-2, and thereafter this timer may be held in the operative position by relay contacts CR-1A.

As previously described, the timer TR-2 determines the dwell time of the screw in the retracted position, during which time the plastic material is plasticized and removes heat from the barrel 12. This may, for example, be a setable time period of from 0 to 5 minutes. At the conclusion of this cycle defined by the timer TR-2 the normally closed contacts TR-2A and TR-2B are open, thus removing power from the control relay CB-1 and effecting automatic resetting of the timer TR-2. The cycle is now automatically repeated by the reclosing of the contacts TR-2A and TR-2B.

As described above, the counter 44 is advanced one position for each cycle of operation, and in the final position disables the automatic operation by opening contacts 44a. Counter 44 also has a reset coil 68 which is connected to receive power from the line by the turning off of the switch 42, thus automatically resetting the purging system for another use.

It may be desirable in some installations to provide some audible signal of the fact that purging is in progress. For this purpose, a warning signal, such as a bell 70, may be applied to the control unit 40. The bell 70 may, for convenience, be connected in series with the counter forward operating coil 59 to give a signal with each injection cycle to warn others in the area that the system is under automatic purge conditions.

It will thus be seen that a simple and effective control system is provided for the automatic purging of a plastic injection machine. At the end of a work day, the operator merely has to set in the times on timers TR-1 and TR-2 according to the known characteristics of the material being used, and set in an appropriate number of counts which are known to provide effective cooling of the barrel 12. If by chance too high a number of counts are introduced, there is no damage to the system since the screw 12 and the drive motor 25 are designed to stall under high torque loading which occurs with an attempt to plasticize the plastic material 15 in a barrel which has become too cool for this purpose. Preferably, the number of counts on the counter is chosen by experience, the same not being particularly critical, to provide sufficient cooling of the barrel so that the plastic material remaining does not undergo degradation.

The system of the present invention also has utility for use during lunch breaks, coffee breaks, shift changes and the like where it is not desired to shut down the machine but rather to keep it at full-operating temperature. In this case, the counter 44 is set at its highest count, and the system is placed in operation merely to keep plastic material moving through the injection machine during the break. Of course, the plastic material is collected in a suitable save-all pan for regrinding and later use. If desired, the counter 44 may be formed of the "constant on" type in which, when placed at maximum count position, the forward counting coil 59 is deactivated, permitting in effect continuous and unlimited cycling until the counter is returned by hand to an effective counting position, or until the unit 40 is turned off by the switch 42.

While the form of apparatus herein described constitutes a preferred embodiment of the invention, it is to be understood that the invention is not limited to this precise form of apparatus, and that changes may be made therein without departing from the scope of the invention.

What is claimed is:

1. An automatic purging and shutdown system for a reciprocating type of plastic injection machine having a reciprocating member received in a barrel for ejecting such plastic material for cooling down the barrel of such machine to prevent degradation of plastic material remaining in the barrel after shutdown, comprising circuit means which operates in a cycle of operation and causes said member to initiate an ejection cycle including first timer circuit means connected to delay retraction of said member for a predetermined short time interval to assure the emptying of said barrel of plasticized plastic material and thereafter to cause the return of said member inwardly of said barrel to receive an additional quantity of plasticized material therein, second timer circuit means connected to initiate a subsequent ejection cycle after a predetermined time delay of a duration longer than that provided by said first timer circuit means providing for absorption of heat from said barrel by the new charge of unplasticized material and providing for plasticizing of said material, and means automatically terminating further ejection cycles when said barrel has cooled sufficiently to prevent degradation of plastic material remaining therein.

2. The system of claim 1, in which said last-named means includes a counter connected to operate on each cycle of operation and which, after a predetermined number of such cycles, disables further operation.

3. The system of claim 1 further including means providing an audible warning signal for each cycle of operation.

4. An automatic purging and shutdown system for a reciprocating screw type of plastic ejection machine in which a hydraulic drive motor is connected to rotate the screw and a hydraulic piston is connected to thrust the screw forwardly in the barrel, including a source of fluid under pressure and first valve means connected to said source and said motor to control the hydraulic motor and cause rotation of the screw for receiving and plasticizing a charge of plastic material in the barrel and second valve means is connected to said source and to said piston to control the application of such fluid pressure thereto for effecting ejecting movement of such charge from the barrel, the improvement in automatic purge and shutdown system for such machine including control means connected to said first valve means to cause a charge of plastic material to be formed in said barrel, timer means connected to control said second valve means for ejecting said charge after a predetermined time interval sufficient to permit plasticizing resulting in removal of a quantity of heat from said barrel, and switch means for repeating in sequence the operation of said control means and said timer means until said barrel has cooled sufficiently to permit shut down of said machine without degradation of plastic material remaining in said barrel and thereafter automatically shutting down said machine.

5. The system of claim 4 in which said control means includes a controllable timer for delaying for a variable but short time period the operation of said first valve means subsequent to the operation of said second valve means to assure complete ejection of plastic material from said barrel.

6. The system of claim 4 in which said repeating means includes a counter which causes said control means to operate through a preset number of cycles of operation and thereafter disables said control means.

7. The system of claim 4 further includes an audible signal operable in each cycle of operation to warn that automatic purging is in progress.

8. The system of claim 1 in which each said first and second timer circuit means includes a variable timer.